Patented Jan. 12, 1943

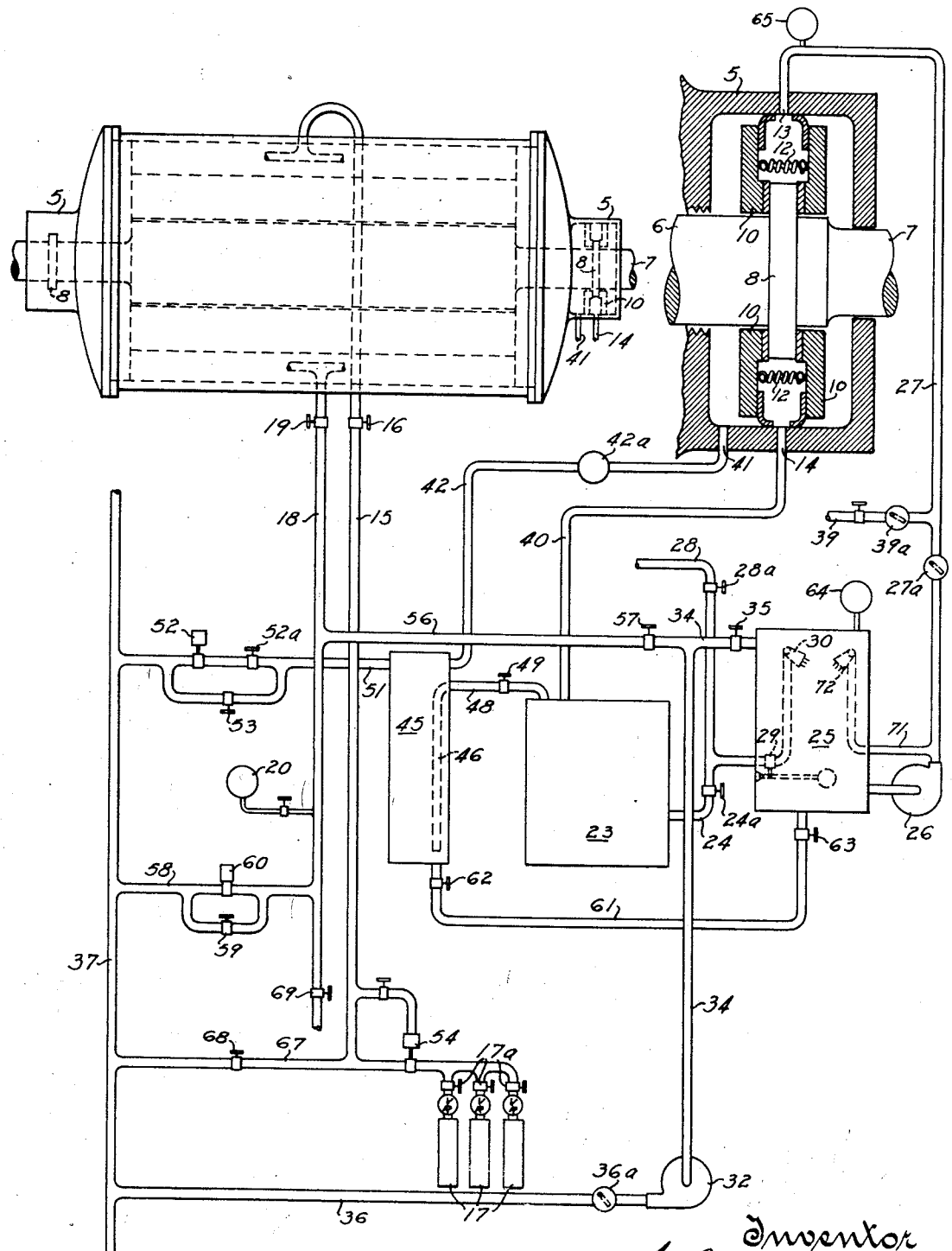

2,307,754

UNITED STATES PATENT OFFICE 2,307,754

HYDROGEN-FILLED APPARATUS

Sterling Beckwith, West Bend, Wis., assignor to Allis-Chalmers Manufacturing Company, Milwaukee, Wis., a corporation of Delaware Application August 3, 1940, Serial No. 350,985

8 Claims. (Cl. 171—252)

The present invention relates in general to hydrogen-filled apparatus and the operation and maintenance of the same, and it has more particular relation to hydrogen-cooled electrical machines, such as generators and synchronous condensers, utilizing a cooling medium of hydrogen gas, and the operation and maintenance of such machines.

Hydrogen, as a cooling medium for dynamoelectric machines, is recognized as being more efficient than air; and the use of hydrogen, as a substitute for air, in relatively large electrical machines, such as high speed turbo-generators and synchronous condensers, has increased steadily, and with satisfactory operating results as to reduced heat and windage losses, since its relatively recent inception. In practice, in a properly designed system, the active parts of the electrical machine operate in an enclosing housing filled with hydrogen at a low positive pressure, the housing being essentially impervious to appreciable dissipation or leakage of hydrogen. While some minor degree of leakage may be expected through the housing and about seals thereof, requiring the supply of additional hydrogen to the machine to maintain a desired pressure and degree of purity of the hydrogen within the enclosing housing, still this feature does not appreciably detract from the general success of such machines in commercial operation.

One factor which is of considerable importance in the operation and maintenance of hydrogen-filled machines is the avoidance of explosive mixtures of hydrogen and air, or its oxygen constituent. The exercise of suitable precautions toward avoiding such explosive mixtures, particularly in connection with filling the machine enclosure with, and emptying it of, hydrogen has heretofore involved substantial expense, particularly incident to the loss of hydrogen and the cost of a special inert scavenging gas, such as carbon dioxide, and has required very considerable time in getting such machine from open condition into line service, and likewise in taking the machine from service and removing hydrogen gas therefrom, as for inspection or repairs.

In order to avoid explosive mixtures of hydrogen and air during filling with hydrogen the enclosure of a hydrogen-filled machine and the removal of hydrogen therefrom, operations which are necessary from time to time, it has heretofore been customary to use carbon dioxide, which is heavier than air or hydrogen, as an inert scavenging agent, to fill the housing with such gas at substantially atmospheric pressure. In order to properly fill the entire machine housing with hydrogen at the suitable operating pressure, where carbon dioxide is used as the scavenging agent, a substantial excess amount of hydrogen is required, since there is some mixing of the hydrogen with the scavenging carbon dioxide; and more particularly, there are likely to be various pockets in the machine housing and in the machine itself from which it is difficult to suitably remove all of the carbon dioxide gas and substitute substantially pure hydrogen therefor. While this practice of scavenging hydrogen-filled machines with carbon dioxide has been recognized as expensive, especially in connection with the cost of the carbon dioxide and the extra amount of hydrogen required to completely fill the machine housing, as well as time-consuming, because of the intermediate step of filling with and thereafter removing the carbon dioxide, nevertheless, this process has represented the best practice heretofore available in connection with the operation and maintenance of hydrogen-filled machines.

The present invention contemplates improvements in hydrogen-filled apparatus, and more particularly in connection with the operation and maintenance of such apparatus incident to the scavenging of the enclosed apparatus in filling them with, and emptying them of, hydrogen. And the invention contemplates as a feature thereof the use of air, as a substitute for a heretofore used relatively expensive scavenging agent, such as carbon dioxide, in such a manner as to avoid explosive mixtures of air and hydrogen liable to prove harmful to the hydrogen-filled apparatus.

I make use of a discovery arrived at, and confirmed through extensive tests, that, while mixtures of air and hydrogen wherein hydrogen is present in an amount varying from approximately 5% to 75% of the mixture are combustible with explosive effects under atmospheric pressure, nevertheless, hydrogen and air mixtures, in any proportions, at pressures of or below approximately one-fifth of an atmosphere, are not explosive or combustible, and that the liability of harmful or dangerous explosion or combustion of such mixtures at sub-atmospheric pressures above approximately one-fifth of an atmosphere increases with increase in such pressure and increases as the ratio of hydrogen to air in the mixture increases up to a value of approximately one-third hydrogen to two-thirds air, and decreases as the ratio of hydrogen to air in the mixture increases above such one-third value. For instance, mixtures of hydrogen and air, at one-half atmospheric pressure, are explosive when the hydrogen content of the mixture is between approximately 15% and 65% and are non-explosive when the hydrogen content is less than approximately 15% or greater than approximately 65%, and mixtures of hydrogen and air, at one-fourth atmospheric pressure, are explosive when the hydrogen content is between approximately 27% and 40% and are non-explosive when the hydrogen content is less than approximately 27% or greater than approximately 40%; and maximum explosive effect at the various pressures is developed when the hydrogen content of the mixture is approximately one-third. And I have developed a hydrogen-filled machine with appurtenant apparatus for maintaining the desired hydrogen content of the machine enclosure during normal operation thereof and providing a low pressure air-scavenging of the machine, as a substitute for the more expensive prior art carbon dioxide scavenging, as well as a method of scavenging such machines which has given eminent satisfaction in the commercial operation and maintenance of large hydrogen-cooled machines in service.

Desirable advantages of the present invention are generally concerned with simplification of the necessary appurtenant apparatus and reduction of the expense and time consumed in scavenging hydrogen-filled machines, whether it be scavenging of atmospheric air from the machine, incident to placing it in service, or scavenging of hydrogen from the machine, incident to taking the machine out of active service. Among these advantages are (1) a saving in the expense incident to substituting air for the more expensive scavenging gas, such as carbon dioxide, coupled with avoidance of the necessity of providing a source of air under pressure for scavenging carbon dioxide from the machine after the hydrogen has been removed, (2) avoidance of danger of subjecting workmen to undesirable toxic effects caused by breathing mixtures of carbon dioxide and air, (3) a substantial saving in the amount of hydrogen, in excess of the actual volume contained in the filled machine, required in filling the machine enclosure, this saving being incident to the fact that hydrogen is substituted for the scavenging air at approximately one-fifth of atmospheric pressure, (4) a saving of time involved in the scavenging operations, and (5) simplification and reduction of expense of the necessary appurtenances of the hydrogen-filled machine, required for normal operation thereof and also the scavenging thereof.

Features of invention disclosed herein and concerned with the gas-filled machine enclosure and appurtenant apparatus, for providing desired normal operating conditions and also evacuation and replacement of the gas content of the machine enclosure, are particularly claimed in applicant's copending application, Serial No. 423,077, filed December 15, 1941, the latter application being a division of the present application.

It is an object of the present invention to provide an improved method of safely scavenging and replacing the gas content of machine enclosures having a normal content of gas likely to form combustible mixtures with air or like oxygen-containing gas under atmospheric pressure.

It is the further object of this invention to provide an improved method of safely scavenging hydrogen-filled apparatus without the use of a special inert gas, such as carbon dioxide.

It is a further object of this invention to provide an improved method of safely scavenging hydrogen-filled apparatus through the use of air, at sub-atmospheric pressure, as a scavenging agent.

These and other objects and advantages are attained by the present invention, various novel features of which will be apparent from the description herein and accompanying drawing, disclosing an embodiment of the invention, and will be more particularly pointed out in the annexed claims.

In the accompanying drawing, the single figure is a diagrammatic showing of a hydrogen-cooled dynamo-electric machine, with a shaft seal of the machine shown in enlarged section, and appurtenances for controlling the supply of hydrogen to the machine for normal operation thereof, and for effecting the scavenging of the machine.

In the drawing, 5 indicates the enclosing housing of a hydrogen-cooled dynamo-electric machine of the high speed turbo-generator type, the shaft 6 on which the rotor of the machine is mounted protruding from the housing of the machine and being provided with journal portions 7 located externally of the hydrogen-filled portion of the housing, and designed to be mounted in stationary bearings. The housing is effectively sealed about the rotating shaft through an annular flange or runner 8 on the rotating shaft near the end thereof and disposed in a recessed portion of the end wall of the housing 5 and an annular seal surrounding the runner 8 on the shaft and having a close running bearing upon the axial sides of the runner 8 to prevent leakage of hydrogen from the housing 5. As indicated, a conventional thrust bearing ring 10, with a babbitt or the like bearing face, bears on one, or preferably, on each axial face of the runner 8, these bearing rings being drawn into and held in desired close engagement with the opposed faces of the shaft runner 8 by means of a plurality of tension springs 12 between radially outer extensions of the thrust bearing rings.

Oil under pressure is circulated through the annular space between the bearing rings, from an inlet port 13 at the upper side of the seal occupying portion of the enclosing housing 5, and is discharged through a port 14 in the housing at the lower side thereof. Cup leathers, or washers or the like, are secured at the opposed outer edges of the bearing rings and have sealing engagement with the cylindrical wall of the housing. This supply of oil, fed at a pressure suitable to force cooling oil and to oppose the hydrogen gas pressure, maintains the sealing device cool and serves to lubricate the bearing surfaces of the runner 8 and the bearing rings 10. And the springs 12 serve to hold the bearing rings in sealing engagement with the runner 8 under a sufficient degree of pressure to insure against appreciable leakage past the seal of hydrogen from within the machine or of air from without the machine, in case the pressure within the machine drops below atmospheric pressure. Sealing devices of this character are already known in the art and in successful commercial use; and as the details of this seal form no part of the present invention, further description of this feature is omitted.

A hydrogen supply conduit 15, controlled by a valve 16, connects a battery of hydrogen flasks 17, controlled by valves 17ª, and preferably provided with reducing valves, to provide for feeding from any of the flasks as may be required, the discharge end of the hydrogen supply conduit opening into the upper part of the enclosing housing 5. An air supply conduit 18, controlled by a valve 19, opens into the enclosing housing 5 at the lower side thereof, this conduit being supplied with a pressure gauge 20. An oil supply tank or reservoir 23 is provided, and oil is supplied from this tank through a conduit, indicated at 24, and provided with a control valve 24ª, and through a vacuum drying tank 25, whence it is forced under pressure by a pump 26 to a supply conduit 27, controlled by a variable setting check valve 27ª and through which oil is delivered under suitable pressure to the port 13 at the upper side of the sealing device 8, 10 on the shaft adjacent the end of the enclosing housing, as well as to any other point which it is desired to supply from this source. An alternative supply, indicated at 28, for the vacuum tank 25 may be provided, if desired, a control valve 28ª being provided in the supply conduit 28.

As indicated, the supply of oil to the vacuum tank is automatically controlled by a float valve 29 from which the oil passes to a spray nozzle 30 which discharges the oil as a spray, to permit entrained water, in vapor form, to be removed from the oil. This vapor, and any air, are drawn off from the vacuum tank by a vacuum pump 32, through a conduit 34, controlled by a valve 35, the pump discharging to atmosphere through a conduit 36, provided with a check valve 36ª, and connected with the conduit 37 open to the atmosphere. An emergency oil supply, indicated at 39 and provided with a variable setting check valve 39ª for the conduit 27 feeding oil to the sealing device, may be provided, for use in case the vacuum tank is out of order.

The oil discharging from the port 14 at the lower side of the shaft sealing device discharges through a conduit 40 to the oil reservoir 23. And any oil that may leak past the shaft sealing device to the space open to the hydrogen content of the enclosed machine passes through a port 41, in the lower side of the enclosing housing wall, and a conduit 42, provided with a sight flow gauge 42ª to a detraining tank 45 containing, or forming with a straight vertical tube 46, an effective U-tube so that hydrogen cannot escape by way of the oil discharge conduit 48, controlled by a valve 49 and connected to the upper end of the vertical tube 46 within the upper part of the tank at a point removed from the upper end thereof. The U-tube thus provided is of sufficient vertical length, and the cross-section of the tank 45 is suitably great relative to the cross-section of the tube 46 that the increments of hydrogen-laden oil discharged into the tank from the conduit 42 will remain in the body of the tank sufficiently long during travel of such oil to the lower end of the tube 46, which is only slightly above the bottom of the tank 45, to permit hydrogen bubbles to escape from the oil to the space at the upper end of the tank 45 above the level of the oil therein, the oil level being determined by th position of the upper end of the vertical tube 46 and its connection to the conduit 48. Excess hydrogen in the gas space above the oil level in the detraining tank 45 passes to the machine enclosure 5 through the same conduit 42 and port 41 through which the hydrogen-laden oil passes to the detraining tank.

In case the purity of the hydrogen in the machine housing becomes too low, it may be raised by allowing hydrogen from the detraining tank to escape through a conduit 51, preferably controlled by an automatic valve 52, responsive to the degree of purity of the hydrogen, to the atmospheric conduit 37. The purity responsive valve preferably has a manually controlled valve 52ª in series with it, and both valves 52 and 52¹ are preferably by-passed by a manually controlled valve 53. With the valve 53 closed and the valve 52ª open, opening of the valve 52 reduces the pressure of hydrogen within the system, and eventually causes the automatic pressure responsive valve 54 to open to admit a supply of pure hydrogen from the hydrogen flasks 17.

A conduit connection 56, controlled by a valve 57, is provided from the conduit 34 connected to the vacuum tank, to the air conduit 18, the latter being connected to the atmosphere conduit 37 through a conduit 58, controlled by a manually operated valve 59 and, if desired, by an automatic pressure operated relief valve 60. And a conduit connection 61, controlled by valves 62 and 63, is provided between the lower end of the detraining tank 45 and the vacuum tank 25. A vacuum gauge 64 is connected to the air or vacuum space of the drying tank 25; and a pressure gauge 65 is associated with the oil supply pipe 27 at a point adjacent its connection to the inlet port 13 of the enclosing housing 5. The hydrogen supply conduit 15 may be connected to the atmospheric conduit 37 through a conduit 67, controlled by a valve 68. And the air conduit 18 may have a valve 69 therein controlling an opening to atmosphere.

Assuming that the hydrogen-cooled machine is at rest and empty of hydrogen and disconnected from the hydrogen supply 17, with the valves 17¹ closed, and that it is desired to place the machine in normal condition for operation, the valves 16 and 19 in the hydrogen and air conduits, respectively, are opened, and the valves 59 and 68 are also opened to connect the air and hydrogen conduits 18 and 15, respectively, to the atmospheric line 37, so that the pressure within the machine enclosure 5 may readily equalize with the existing outside atmospheric pressure.

Valves 16, 52ª, 53, 59, 68 and 69 are then closed, the valve 19 remaining open; and the valves 35, 57, 62 and 63 are opened. The pressure operated valve 60 remains closed except on the occurrence of excess pressure in the conduit 18.

The check valves in the oil supply lines 39 and 27 are simultaneously adjusted so that the pressure, as indicated on the gauge 65, on the oil supplied from the conduit 27 to the sealing device 8, 10 is about one pound.

With the valve 49 closed, the vacuum pump 32 is then started, at a suitable speed, with a normal cooling water circulation provided for such pump. The pump begins to exhaust the machine enclosure 5 through the air conduit 18, conduit 56 and conduit 34, and from the pump 32, through conduit 36 and conduit 37 to the atmosphere. As the conduit 34 is open at this time, through valve 35, to the vacuum space of the vacuum drying tank 25, the gauge 64 registers the degree of vacuum in the system at the inlet side of the vacuum pump.

When the vacuum in the system has risen to approximately twelve inches on the vacuum gauge 64, the vacuum pumping operation is continued, but preferably with the pump 32 operating at a higher speed than used during the initial stage of exhausting, until the vacuum is raised to twenty-four inches, corresponding to one-fifth atmospheric pressure, or, if desired, somewhat higher, depending on the characteristics of the shaft seal. A conventional sight-flow gauge 42ª in the conduit 42 indicates the flow of oil therein.

With the vacuum of twenty-four inches (one-fifth of atmospheric pressure) maintained, the valve 16 and one or more valves 17ª should be opened, thus providing a supply of hydrogen from the flasks 17, through the conduit 15, to the upper portion of the machine enclosure 5. The vacuum should be maintained close to twenty-four inches, and preferably not above the latter figure, during this operation. Sufficient hydrogen is admitted to the machine enclosure during this operation to take the place of the air being evacuated at the low pressure and to fill the space volume within the enclosure at the vacuum maintained, i. e. twenty-four inches.

When the air has been fully evacuated from the machine enclosure and replaced by hydrogen at approximately one-fifth of atmospheric pressure, the vacuum pump 32 is then shut down, and the valves 57 and 35 are closed; and sufficient additional hydrogen is supplied, with the valve 16 opened, from the flasks 17 to bring the pressure within the machine enclosure 5 up to about one-half pound above atmospheric pressure, as indicated on gauge 20. In the course of this latter process, as the hydrogen pressure reaches zero (atmospheric) within the machine enclosure 5 the valves 49 and 52ª are opened and the valves 62 and 63 are closed. And the valve 35 is opened to place the drying tank 25 in communication with the pump 32, the latter operating at a suitable speed to maintain the desired degree of vacuum in the drying tank.

The machine is now free to operate under normal conditions in a medium of hydrogen gas at a slight positive pressure, sufficient to repel the entrance of air from the external surroundings, the desired degree of purity and pressure of the enclosed hydrogen gas being automatically controlled by devices known in the art, to maintain the same at desired normal operating values. Under this normal operating condition, the setting of the check valves in the oil supply lines 27 and 39 may be adjusted to bring the pressure of the oil fed to the sealing device 8, 10 up to normal value.

As indicated hereinabove, during the normal operation of the machine, the same vacuum pump 32 is used for maintaining the desired vacuum in the vacuum drying tank 25, as has been described hereinabove for evacuating the machine enclosure 5, except that, under this normal operating condition of the enclosed hydrogen-cooled machine, while the valve 35 is open, the valve 57 is closed. And the oil is now pumped from the drying tank 25 to the shaft-sealing device 8, 10 at a pressure of from twelve to fifteen pounds, and the oil, after passing therethrough and cooling and lubricating the sealing device, passes off, through the port 14 and conduit 40 to the reservoir 23; and any leakage past the sealing device toward the body portion of the machine enclosure passes off, through port 41 and conduit 42 to the detraining tank 45 where any included hydrogen is detrained, the hydrogen-free oil passing then to the oil reservoir 23 from which it is recirculated through vacuum treating tank 25, as described hereinabove.

Assuming now that the machine is inoperative and it is desired to remove the hydrogen content of the machine enclosure 5, then, with the hydrogen supply valves 17ª closed, and the valves 52ª, 53, 59, 68, 69 and 49 closed, and valves 16, 19, 35, 57, 62 and 63 opened, the vacuum pump 32 is operated to exhaust the machine enclosure 5, through conduits 18, 56 and 34, through the pump 32, and through conduit 36 and the atmospheric conduit 37. This evacuation is proceeded with in the manner heretofore described until the vacuum in the machine casing is approximately twenty-four inches. At this stage, valve 68 is partially opened to admit sufficient air to maintain the vacuum at twenty-four inches while the vacuum pump is still running, for a sufficient time to insure that the air fully displaces the hydrogen during this process.

The vacuum pump is then stopped, and the valves 35 and 57 are closed; and the valve 69 and the valve 59, if desired, are opened wide until the pressure in the machine reaches zero (atmospheric). The valve 49 is then opened and the valves 62 and 63 are closed.

As indicated, a by-pass 71 may be provided from the discharge of the pump 26 which will recirculate any portion of the discharge from the pump through a second spray nozzle 72 within the vacuum tank. This will insure fuller vacuum drying treatment of oil received by the pump from the supply in the bottom of the vacuum tank.

Through the use of the hereinabove described system, it is possible to utilize the regular vacuum pump normally provided for operating the vacuum drying tank 25, to evacuate or scavenge the machine enclosure of air, incident to filling the machine with hydrogen, or to evacuate or scavenge the machine enclosure of hydrogen, incident to replacing the hydrogen with air. And through the connection of the hydrogen-detraining tank 45 with the vacuum treating tank 25, through the conduit 61, it is possible to remove oil from the machine while the same is under vacuum.

I have described the evacuation of the dynamo-electric machine enclosure to, and the replacement of the original gas content (air or hydrogen) by the other gas at, approximately one-fifth atmospheric pressure for the reason that, although certain mixtures of hydrogen and air, at sub-atmospheric pressures appreciably above one-fifth atmospheric, as mentioned hereinabove, are non-explosive, nevertheless, in replacing one of the gases by the other at such higher sub-atmospheric pressures it may be difficult to insure that the hydrogen content of the mixture in all parts of the enclosure will be such as is outside the explosive range for the particular pressure. And hence, in order to avoid any possibility of harmful explosion, it is usually desirable that the enclosure be evacuated to, and the gas replacement occur at, approximately one-fifth or less of atmospheric pressure. However, since any explosive pressures, and effects incident to explosion, of any mixture of hydrogen and air ordinarily present within the ordinary dynamo-electric machine enclosure at sub-atmospheric pressures up to approximately one-third atmospheric, or even slightly higher, are harmless to the ordinary enclosure itself and the parts of the dynamo-electric machine therein, it is often practical in accordance with the present invention, particularly in the interest of saving time in the gas evacuation and replacement operations, that the evacuation be to, and the replacement occur at, such latter sub-atmospheric pressures, such operation being without harmful results to the machine enclosure or the machine parts.

The relative simplicity, or lack of complication, and the advantages of the control system hereinabove described in connection with hydrogen-filled apparatus, and more particularly the advantages incident to avoiding the use of special scavenging gas, such as carbon dioxide, and the saving in excess hydrogen required to fill the machine enclosure at normal operating pressure and purity, will be definitely apparent from the disclosure hereinabove.

It should be understood that the present invention is not limited to the exact details of operation and construction described and shown herein, for obvious modifications within the scope of the appended claims will be apparent to persons skilled in the art.

It is claimed and desired to secure by Letters Patent:

1. The method of filling with hydrogen a hydrogen-cooled machine operating in an enclosing housing, which comprises evacuating the initial air content of the machine at least to approximately one-fifth atmospheric pressure, admitting hydrogen to the machine enclosure, while maintaining said reduced pressure therein, to displace the air in the machine enclosure and provide a substantially full content of hydrogen at said reduced pressure, and thereafter admitting additional hydrogen to the machine enclosure to fill the same with hydrogen at desired operating pressure.

2. The method of emptying an enclosed hydrogen-cooled machine of its normal hydrogen content, which comprises evacuating the hydrogen content of the machine enclosure at least to approximately one-fifth atmospheric pressure, admitting air to the machine enclosure, while maintaining said reduced pressure therein, to displace the hydrogen in the machine enclosure and provide a substantially full content of air at said reduced pressure, and thereafter admitting additional air to the machine enclosure to fill the same with air at atmospheric pressure.

3. The method of scavenging and replacing the gaseous content of the enclosure of a dynamo-electric machine normally operating in a gas liable to form combustible or explosive mixtures with an oxygen-containing gas such as air under atmospheric pressure, which comprises reducing the pressure within the enclosure to a value below one-half atmospheric pressure and at which the two gases together are not liable to form harmful combustible or explosive mixtures within the enclosure, replacing the original gas content of the enclosure with said other gas to fill the enclosure therewith at said reduced pressure, and thereafter admitting a further supply of said other gas to the enclosure to fill the same with said displacing gas at desired normal pressure.

4. The method of filling apparatus with hydrogen, which comprises evacuating the initial air content of the apparatus to a pressure less than one-third atmospheric pressure and at which said hydrogen is no longer capable of forming harmful combustible or explosive mixtures with air within the apparatus, admitting hydrogen to the apparatus, while maintaining said reduced pressure therein, to displace the air in the apparatus and provide a substantially full content of hydrogen at said reduced pressure, and thereafter admitting an additional supply of hydrogen to the apparatus to fill the same with said hydrogen at desired normal operaitng pressure.

5. The method of emptying apparatus of hydrogen, which comprises evacuating the initial hydrogen content of the apparatus to a pressure less than one-third atmospheric pressure and at which said hydrogen is no longer capable of forming harmful combustible or explosive mixtures with air within the apparatus, admitting air to the apparatus, while maintaining said reduced pressure therein, to displace the hydrogen in the apparatus and provide a substantially full content of air at said reduced pressure, and thereafter admitting an additional supply of air to the apparatus to fill the same with air at atmospheric pressure.

6. The method of scavenging and replacing the gaseous content of the enclosure of a dynamo-electric machine normally operating in a gas liable to form a combustible or explosive mixture with an oxygen-containing gas under atmospheric pressure, which comprises reducing the pressure of the gas within the enclosure to a value below one-half atmospheric pressure and at which the two gases together are not liable to form a harmful combustible or explosive mixture within the enclosure, replacing the gas within the enclosure by said other gas to fill the enclosure therewith at said reduced pressure, and thereafter admitting a further supply of said other gas to the enclosure to fill the same with said displacing gas at desired normal pressure.

7. The method of changing the gaseous content of an enclosure from one of two gases to the other where said gases under atmospheric pressure are of a character to form an explosive or combustible mixture, which comprises reducing the pressure of the gas within the enclosure to a value substantially below atmospheric pressure and at which such gases are not liable to form a harmful explosive or combustible mixture within the enclosure, replacing the gas content of said enclosure by said other gas to fill the enclosure therewith at said reduced pressure, and thereafter admitting a further supply of said other gas to the enclosure to fill the same with said latter gas at desired pressure.

8. The method of changing the gaseous content of an enclosure from one of either of two gases to the other where one of said gases is hydrogen and the other is air, which comprises reducing the pressure of the gas within the enclosure to approximately one-fifth atmospheric pressure, replacing the original gas content of the enclosure by said other gas to fill the enclosure therewith at said reduced pressure, and thereafter admitting a further supply of said other gas to the enclosure to fill the same with said latter gas at desired pressure.

STERLING BECKWITH.